United States Patent [19]

Duchon

[11] Patent Number: 5,716,031
[45] Date of Patent: Feb. 10, 1998

[54] ARTIFICIAL SATELLITE EQUIPPED WITH AERODYNAMIC ORIENTATION RUDDERS

[75] Inventor: Paul Duchon, Venerque, France

[73] Assignee: Centre National d'Etudes Spatiales, Apris Cedex, France

[21] Appl. No.: 535,214

[22] PCT Filed: Apr. 27, 1994

[86] PCT No.: PCT/FR94/00480

§ 371 Date: Jan. 16, 1996

§ 102(e) Date: Jan. 16, 1996

[87] PCT Pub. No.: WO94/25344

PCT Pub. Date: Nov. 10, 1994

[30] Foreign Application Priority Data

Apr. 27, 1993 [FR] France .................. 93 04953

[51] Int. Cl.⁶ .................................................. B64G 1/23
[52] U.S. Cl. ................................ 244/164; 244/158 R
[58] Field of Search .................................. 244/164, 168, 244/158 R, 49, 87, 173

[56] References Cited

U.S. PATENT DOCUMENTS

| | | | |
|---|---|---|---|
| 3,184,187 | 5/1965 | Isaac | 244/173 |
| 3,304,028 | 2/1967 | Dryden | 244/168 |
| 4,426,052 | 1/1984 | Hubert et al. | 244/168 |
| 5,350,138 | 9/1994 | Culbertson et al. | 244/158 R |
| 5,487,791 | 1/1996 | Everman et al. | 244/173 |

Primary Examiner—Andres Kashnikow
Assistant Examiner—Tian Dinh
Attorney, Agent, or Firm—Pearne, Gordon, McCoy & Granger LLP

[57] ABSTRACT

An artificial satellite equipped with roll, yaw and pitch rudders (4, 4', 5) to impose on it rotational forces around its three axes due to the resistance of the rarefied air which surrounds the satellite (compensation for the dynamic inertia of rotating objects onboard the satellite can also be ensured). This invention applies to low-orbit satellites.

12 Claims, 7 Drawing Sheets

ARTIFICIAL SATELLITE EQUIPPED WITH AERODYNAMIC ORIENTATION RUDDERS

DESCRIPTION

The invention concerns an artificial satellite equipped with aerodynamic rudders to control the orientation of the satellite.

It applies more specifically to artificial satellites whose orbit is low, that is, whose perigee is several hundred kilometers from the surface of the ground, at an altitude where the air is rarefied, but where its influence cannot be neglected.

The traditional means of orienting satellites consist of wheels that use gyroscopic or jet effects and turn at a speed controlled by generators of magnetic forces and by fuel thrusters, but all these devices have the disadvantage of being heavy, consuming relatively large quantities of energy when they operate and not being extremely precise, since vibrations or shocks are transmitted to the satellite.

The invention proposes replacing or supplementing these devices with rudders, that is, variable-orientation louvers which are subject to air resistance to orient the satellite: their orientation is controlled at will to obtain an aerodynamic force that makes it possible to control the satellite; they can also be placed in a resting position, where they have little influence, if not potentially a beneficial protective effect.

The invention is characterized, in the most general form, by the fact that the satellite has pitch rudders at the front and rear of a main body encompassing the center of gravity of the satellite; these pitch rudders are mobile, rotate around transverse axes, and are symmetrical to a median longitudinal plane that goes through the center of gravity of the satellite. The pitch rudders can be made so as to avoid creating dead zones behind them, which would make control of the rudders inoperative at small angles of deviation from the resting position; for this, they can include front louvers on the free ends, away from the main body, or can be formed of panels that get thicker toward the transverse axes of rotation. The satellite can also be equipped with mobile roll and yaw rudders on the left and right that rotate on transverse axes. It can then be oriented according to all its axes, especially if the rudders are composed of pairs symmetrically in relation to the median longitudinal plane of the satellite and especially if there are two of these pairs, since then the yaw and the roll can be controlled independently.

A third aspect of the invention, which can be used in combination with the preceding ones, concerns certain turning objects such as sighting mirrors, or the rudders themselves if necessary, because their control is accompanied by forces of inertia which destabilize the satellite. The invention provides that each system comprising one of these objects, the motor that propels it and the transmission that connects the object to the motor has a total kinetic moment of zero when the motor is propelling the object. This design can, of course, be applied to the rudders themselves.

Now we will move on to a concrete description of the invention using the following attached figures as illustrative, but not limiting:

FIG. 6 shows a detail from FIG. 5, FIGS. 7A and 7B show curves for pitch force as a function of the angular deviation of the rudders.

The figures show various views of the satellite and various aspects of the invention. A satellite (FIGS. 1 and 2) has a center of gravity 0 and longitudinal Xs, transverse Ys and vertical Zs geometric axes intersecting at that point according to FIG. 2 and linked to the satellite; the axes have been shown apart from the satellite on other figures for reasons of clarity. The satellite is composed materially of a main body 1 where the center of gravity 0 is located which holds some equipment, not shown but usual, such as inertia wheels, motors, sensors and various electronics, etc., and panels 3 for generating solar energy.

An aerodynamic reference mark composed of three straight direct axes $X_A$, $Y_A$, and $Z_A$ is defined.

Figure 9:
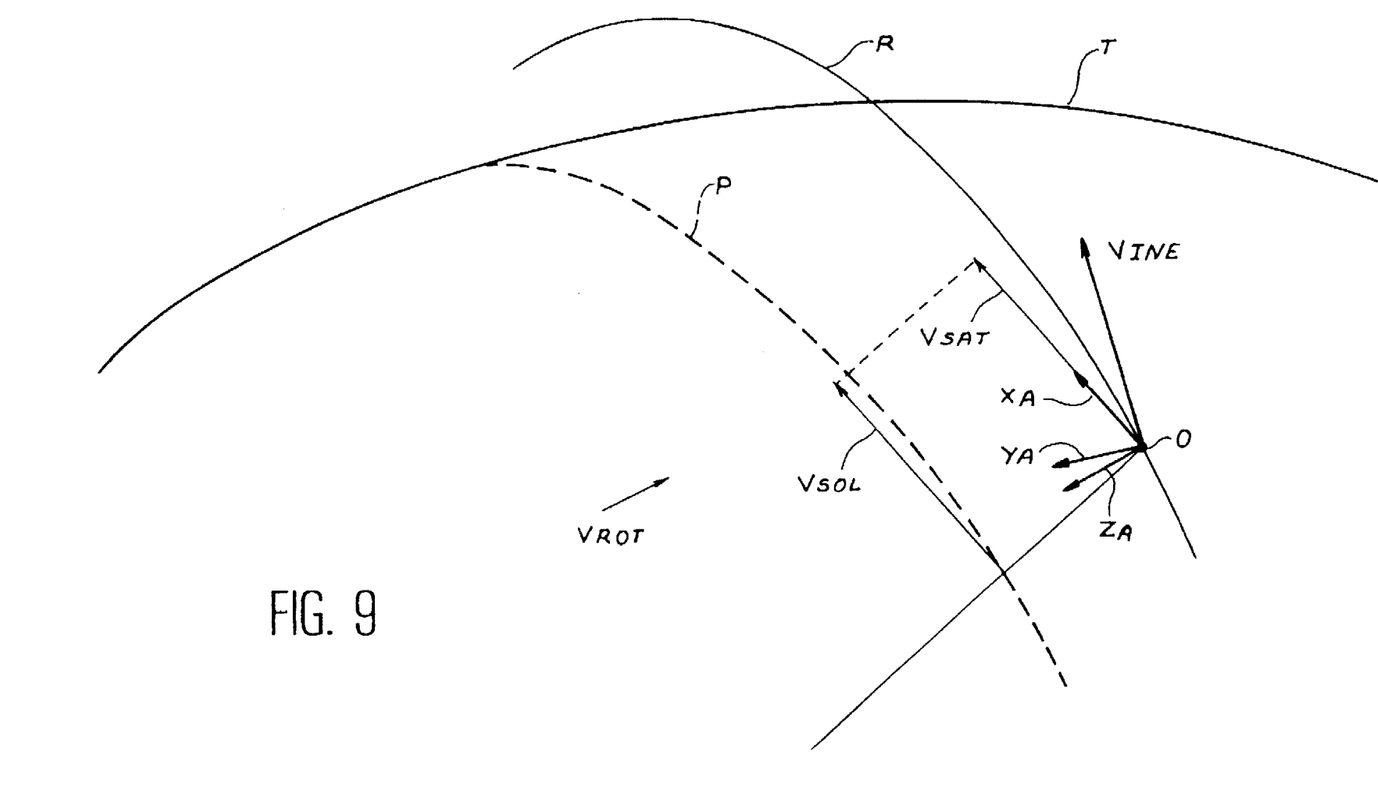
FIG. 9 shows reference marks for the axes.

In FIG. 9, the satellite (symbolized by the center of gravity 0) travels an orbit R whose track on Earth T, obtained by vertical projection, is designated by the letter P. The speed of the satellite on track P is marked $V_{SOL}$ and is equal to the horizontal projection of the vectorial sum of the inertial speed of the satellite $V_{INE}$ and the opposite of the rotational speed $V_{ROT}$ of the Earth T. This sum, called $V_{SAT}$, corresponds to the aerodynamic speed of the satellite if the atmosphere is driven at the same speed as the Earth T, which is not, however, always true, but the differences between $V_{SAT}$ and the aerodynamic speed are normally not greater than two angular degrees.

The speed $V_{SAT}$, identical and parallel to the speed $V_{SOL}$ if the satellite is at a constant altitude, is therefore combined with the aerodynamic speed and used as a base on the axis $X_A$; $Y_A$ is horizontal and oriented toward the left of axis $X_A$, and axis $Z_A$ is descending (it is vertical only if axis $X_A$ is horizontal). The normal orientation of the satellite is defined when the axes $X_A$ and $X_S$, $Y_A$ and $Y_S$, and $Z_A$ and $Z_S$ are merged; the pitch is one rotation of the satellite around $Y_A$, the roll one rotation around $X_A$, and the yaw one rotation around $Z_A$. Control consists of imposing angles of rotation on axes $X_S$, $Y_S$, and $Z_S$ linked to the satellite in relation to axes $X_A$, $Y_A$, and $Z_A$ linked to the trajectory defined in relation to the Earth to cause mispointings of the axes $X_S$, $Y_S$, and $Z_S$ in relation to the axes $X_A$, $Y_A$, and $Z_A$ or, on the contrary, to put them back.

Figure 1:
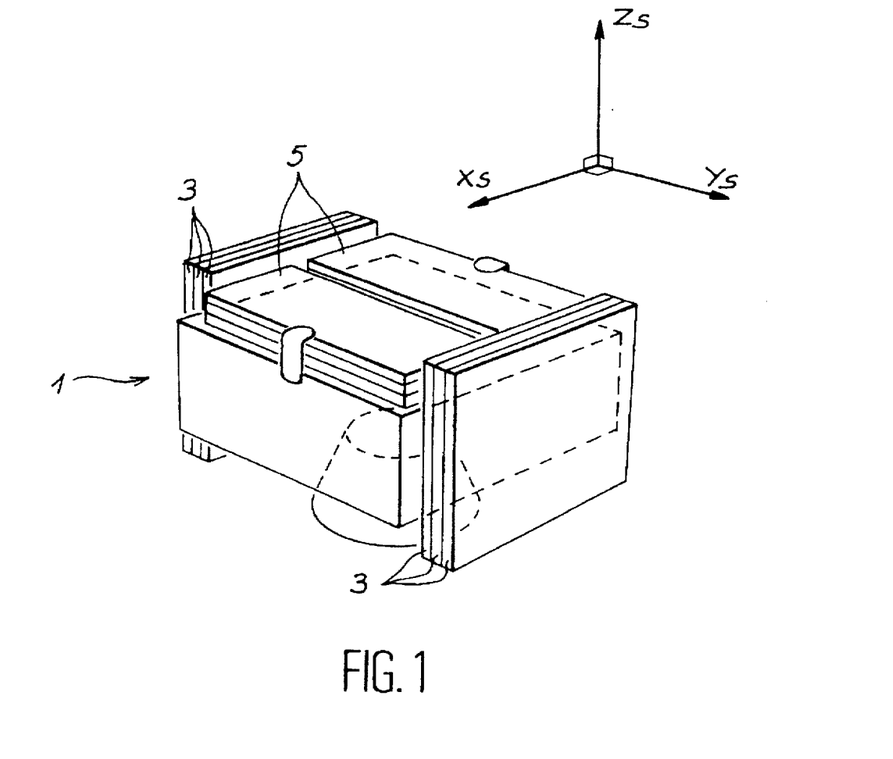
FIG. 1 shows the satellite schematically in perspective under cover of the launcher.
Figure 2:
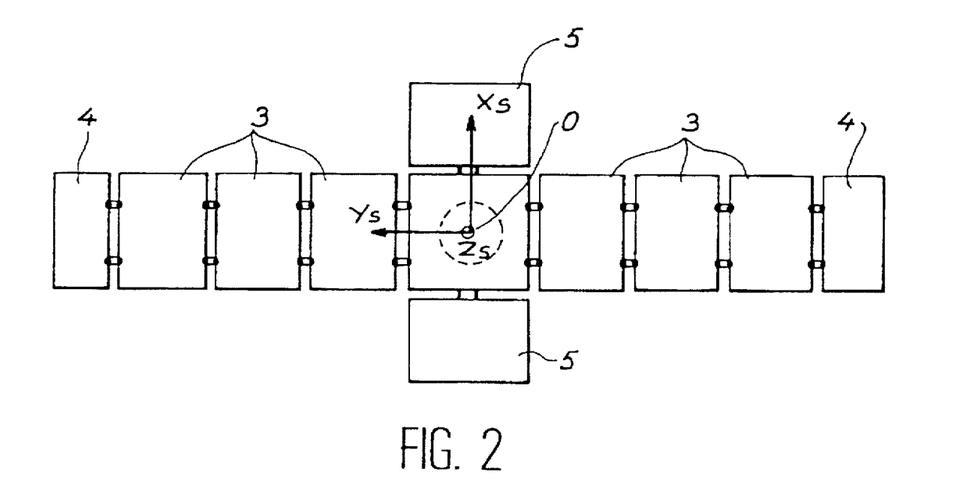
FIG. 2 shows a bottom view of the satellite deployed in orbit.

As shown in FIGS. 1 and 2, the solar panels 3 are stacked one on top of the other (under the launcher cover) or unfolded in a transverse direction, symmetrically to the two sides of the main body 1. The system for attaching the solar generator panels is traditional; here, the panels are assumed to be attached at four points each, so that the whole thing is kept rigid enough. According to the invention, the satellite also has roll and yaw rudders 4 in the form of other panels, which extend the two lateral rows of solar panels 3, and lastly pitch rudders 5 in front and in back of the main body 1, in the direction of the Xs axis.

All rudders are preferably covered with a chrome or other coating that has the property of not absorbing atomic oxygen, which essentially composes the atmosphere beyond 150 km altitude, but of reflecting it and thus not being attacked easily.

When deployed, the solar panels 3 extend into the plane defined by the longitudinal and transverse axes Xs and Ys, or parallel to that plane, as do the rudders 4 and 5 at rest. The pitch rudders 5 also extend symmetrically each in relation to the median longitudinal and vertical plane defined by the axes Xs and Zs. The roll and yaw rudders 4 are distributed in symmetrical pairs in relation to that same plane in the embodiments given here, particularly the one in FIG. 5, which is the most complete.

Figure 3:
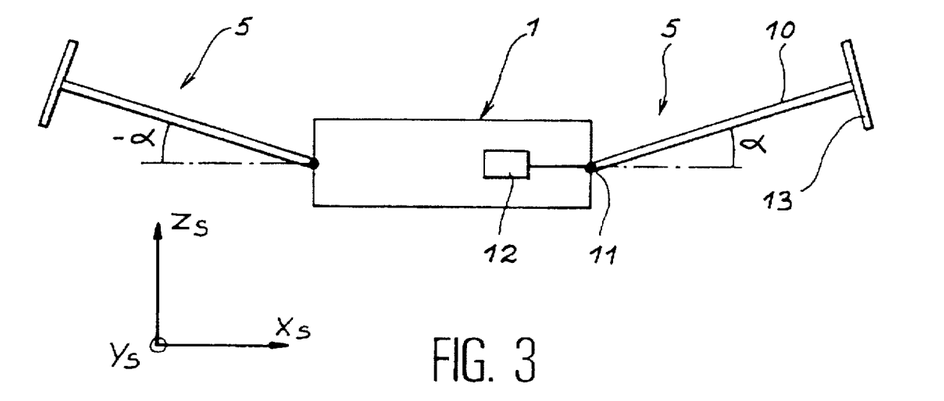
FIG. 3 shows how the first system of pitch rudders is activated.
Figure 4:
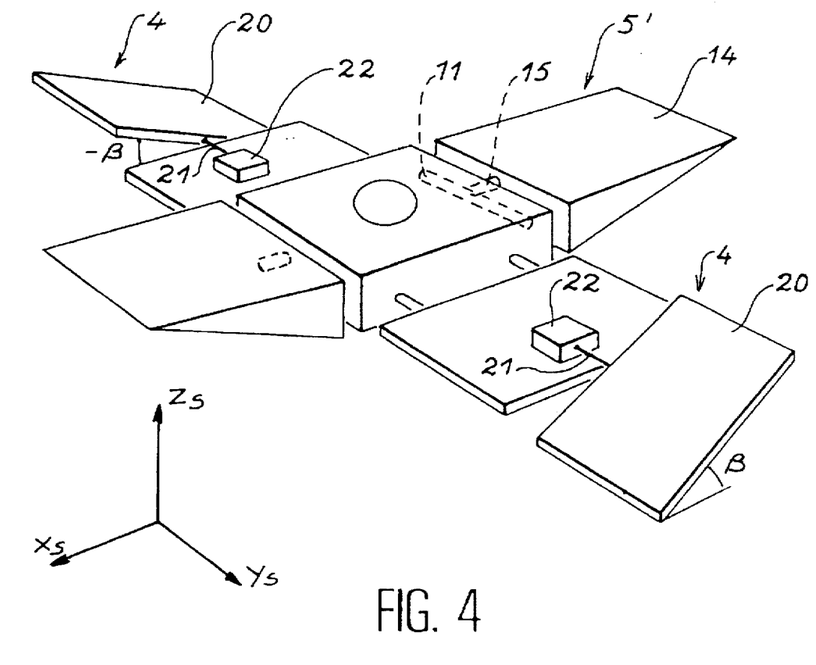
FIG. 4 shows a system of rudders on the satellite.

According to the embodiment in FIG. 3, the pitch rudders 5 can consist of thin panels 10 with constant thickness, turning on one end around a transverse axis 11 located on the main body 1 and equipped with a front louver 13 on the other end, or, according to FIG. 4 where they are marked 5', of panels 14 in the form of wedges that become thinner toward the free end and are connected on their thick end to the transverse axis 11 by separating bars 15 which take them away from the envelope of the main body 1 and make it possible to turn them without interference. Because the rudders 5 and 5' are set in rotation around the transverse axes 11 by motors 12 connected to those axes by transmissions, which are not shown in detail, but are ordinary and may consist of speed-reducing gear trains.

The satellite generally travels through its orbit in the direction of the longitudinal axis Xs, which is then merged with the vector $X_A$ defined previously, and the solar panels 3 are aimed according to the axis $Z_S$.

The rotation of the rudders 5 and 5', and more specifically the one located in the front of the satellite, produces a dissymetrical obstacle to the flow of rarefied air surrounding the satellite and thus a force around the transverse axis Ys of sufficient intensity at altitudes of some hundreds of kilometers to make the desired pitch corrections rather quickly. The shocks are less than with thrusters and even inertia wheels, so that more gradual, better controlled changes are made.

The value of the force and the tipping acceleration depends on the inclination of the pitch rudders 5 and 5' that is decided on; the rotational speed of the rudders can be some degrees per second. The energy used is less than required for the known devices, even if one adds the energy to be provided to overcome the additional air resistance produced by the tipping of the rudders and to keep the satellite at the desired speed.

The surface of the rudders can be several square meters.

Figure 7:
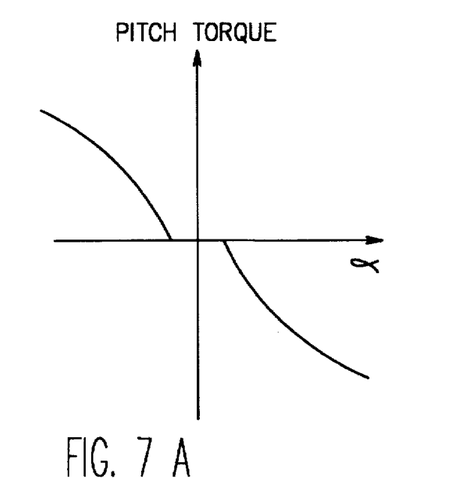

The pitch rudders could consist merely of the panels 10 in the form of plates, since it can be seen that the rotation of such plates around the axis 11 would produce the aerodynamic obstacle desired and the tipping force around the transverse axis Ys. However, if the angle α of deviation from the resting position, where the panels 10 are in the plane XsYs or parallel to it, is small, we find experimentally that a dead zone or weak-control zone exists, that is, that little measurable effect of force is produced. The front louvers 13, oriented in a plane parallel to the planes Ys, Zs at rest, work to eliminate this zone and to produce a force even if the angle α of rotation is very small. On the attached curves, we will compare FIGS. 7A and 7B, which represent the forces obtained as a function of the angle α for panels 10 with and without a front louver 13. The rudder 5 or 5' located in the rear is not directly involved in the formation of the tipping force and could therefore remain in the resting position, but we prefer to tip it at an angle −α to keep it symmetrical to the other in relation to the transverse and vertical plane YsZs in order to cancel the moment due to the forces of inertia produced by the tipping of the rudders. The tipping of each of the rudders 5 or 5' actually produces an inertial moment which is superimposed on the original aerodynamic force and whose exact value can be difficult to evaluate, but which we are assuming to be identical except for the sign to similar rudders moved in opposite directions. The influence of the inertia can then be neglected. It should be noted that some solar panels 3 could act as rudders, but it is preferred to use bare panels, which are lighter and thus have less mass and inertia.

The wedge shape of the pitch rudders 5' opposes the appearance of a dead zone on the rudder 5' responsible for the tipping.

Another advantage of these two embodiments is that the envelope of the main body 1 is better protected from attacks by atomic oxygen and small impacts, since the rudders 5 and 5' shelter it. On the other hand, in the case of the solution in FIG. 4, the rudders 5' procure an aerodynamic effect which can make it possible to reduce the consumption of ergol for orbital control in a ratio of two to four compared to the other solution.

Figure 10A:
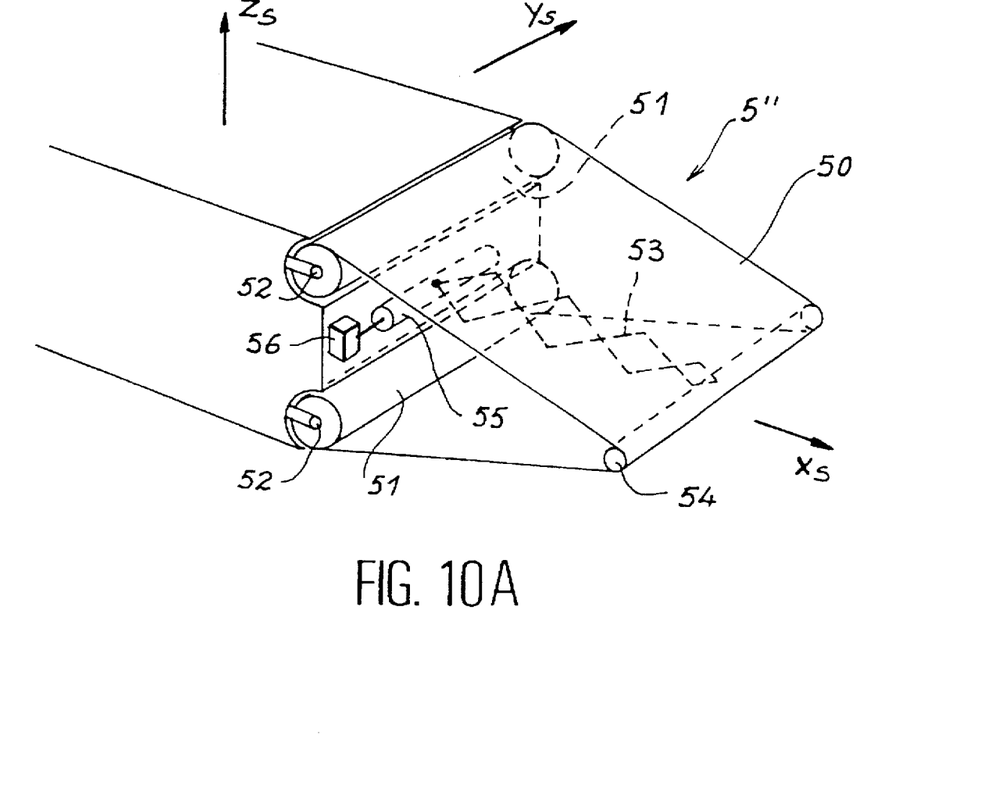
FIGS. 10A and 10B show a last system of rudders for the satellite.
Figure 10B:
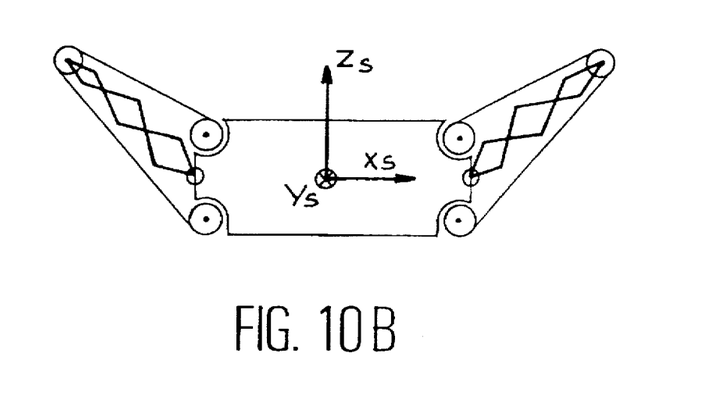

FIGS. 10A and 10B show a third possible embodiment for the pitch rudders 5" which then consist of a sheet-metal strip 50 held like a tent between two rollers 51 adjacent to the central body 1, located parallel to the transverse axis Ys. They rotate around axes 52 near the upper and lower edges of the front or rear side of the central body 1, but torsion springs, not shown, are located between the rollers 51 and the axes 52 to help wind the sheet-metal strip 50 around the rollers 51, which a telescopic arm 53 allows when it is folded. The telescopic arm 53 is composed of two lines of rods jointed between them and in their centers in order to draw rhombi. A system that can be composed of an endless screw turning some toothed sectors integral with the rods on the ends of the two lines—like automobile jacks—make the telescopic arm 53 straighten or retract and carry to the opposite end of the central body 1 a yardarm 54 parallel to the rollers 51 which pulls and unwinds the sheet-metal strip 50 when it is moved away from them.

Moreover, the telescopic arm 53 is joined to the central body by a transverse shaft 55 in which its control mechanism is housed. The transverse shaft 55 need only be pivoted by another motor 56 to tilt the telescopic arm 53 up or down and thus control the maneuvering of the pitch rudder 5", with a different winding of the sheet-metal strip 50 around the rollers (FIG. 10b). The sheet-metal strip 50 is covered on the outside with a coating resistant to atomic oxygen as defined above.

In their simplest form, illustrated in FIG. 4, the roll and yaw rudders 4 can include two panels 20 placed symmetrically in relation to the median longitudinal plane XsZs that are rotated around transverse axes 21 by motors 22. (A speed-reducing transmission is also interposed between the panels 21 and the motors 22.) If, as shown in the figure, the two panels are turned at equal and opposite angles +β and −β, the resultant force is produced around the Xs axis, that is, a roll.

If we want to produce a yaw, the plates 20 must be turned at different angles or only one must be turned, but the disadvantage of this embodiment is that a superfluous roll force is also obtained.

That is why we may prefer to the rudders 4 rudders 4', which are composed of at least two panels (FIG. 5), for example a median panel 23 surrounded by two panels 24 on the ends integral to them. The median panel 23 is moved around an axis by a motor 27, and the end panels 24 are moved by the same motor 27. In effect (FIG. 6), the motor 27 controls two transmissions 28 and 29 that have a common part and are separate only toward two hollow coaxial shafts 30 and 31 that they control, respectively: the internal hollow shaft 30 is linked to the central panel 23, and the external hollow shaft 31 is linked to the end panels 24. This external hollow shaft 31 is divided into two parts on the two sides of the central panel 23, but braces 25 make the end panels 24 interlock by joining their outer edges; they extend a little beyond the outer edges of the central panel 23 so as not to disturb the rotations of the panels 23 and 24.

Figure 6:
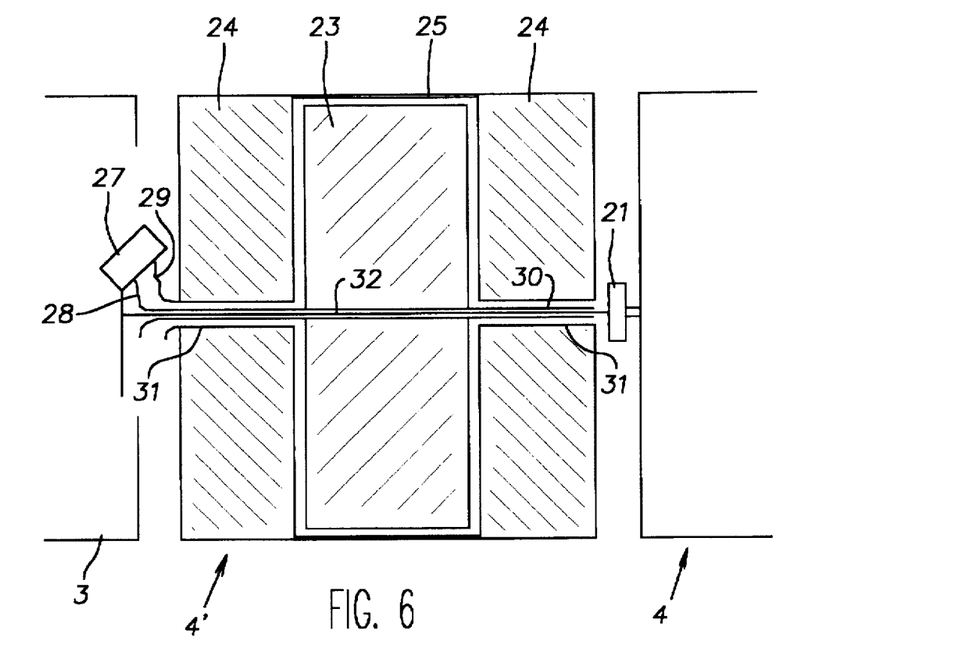

The transmissions 28 and 29 consist of similar reducing gear trains, except for a wheel for reversing the direction of rotation: the end panels 24 are subject to rotations identical to those of the central panel 23 but in opposite directions. While the total surface of the end panels 24 is similar to the surface of the central panel 23, the resultant aerodynamic action is purely longitudinal (along the Xs axis) and causes a pure yaw.

An internal shaft 32, around which the hollow internal shaft 30 pivots, connects the solar panel 3 that is adjacent to the rudder 4' and holds the motor 27 and the transmissions 28 and 29 to the motor 21 of the embodiment in FIG. 4. Indeed in the embodiment in FIGS. 5 and 6, we are choosing to cumulate the rudders 4' and the rudders 4 already encountered, which are designed to control pure rolls and are oriented at opposite angles.

The shafts 30, 31 and 32 are mutually supported by bearings or roller bearings, and the shaft 30 is attached to the solar panel 3. The shaft 30 is supported on the solar panel 3 by a bearing.

Figure 5:
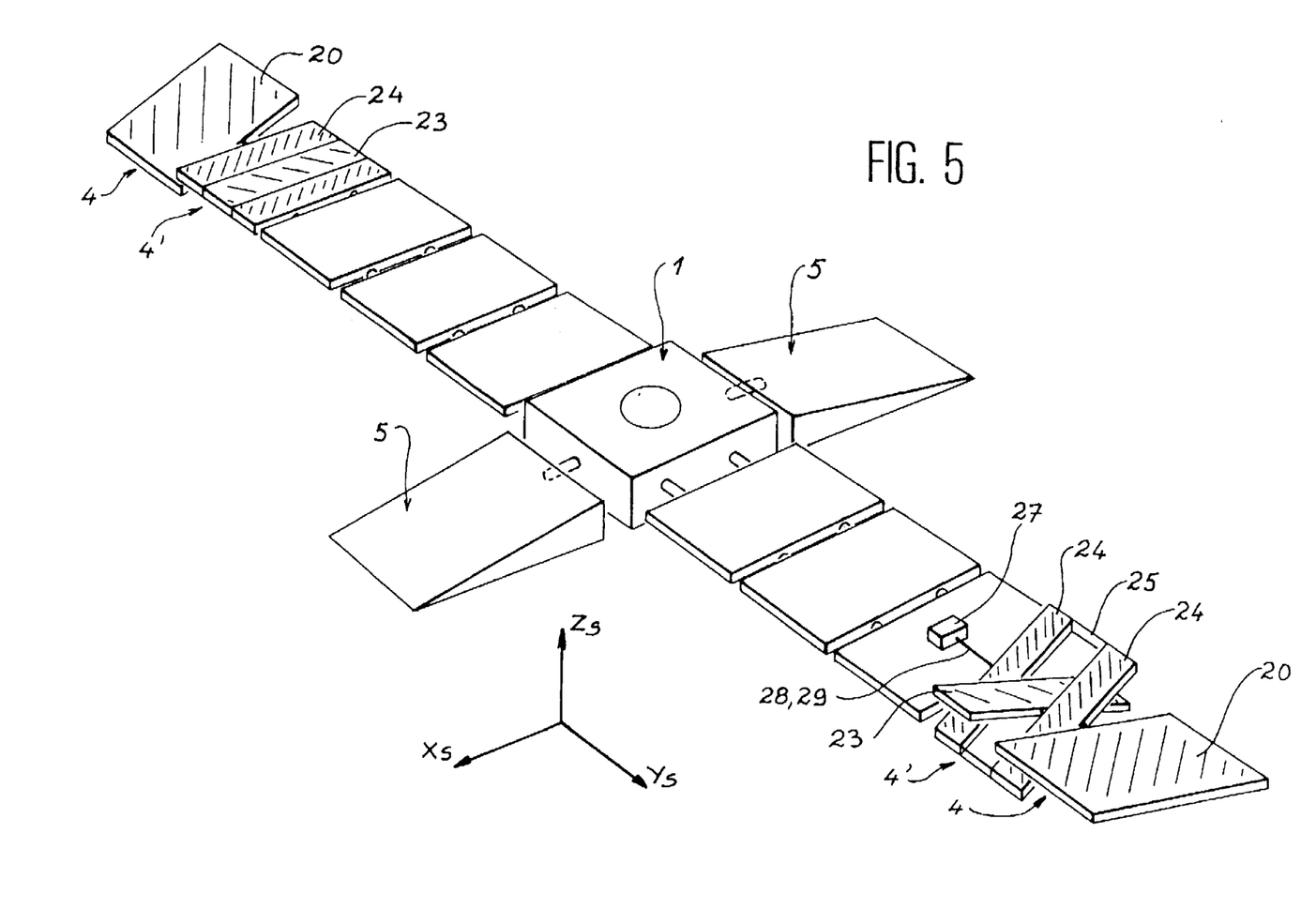
FIG. 5 shows another system of rudders.

Other ratios of rotation of the central panel 23 and the end panels 24 can cause a yaw force around the axis Zs, while the resultant roll force is zero, if the ratio of their surfaces is different. This property of uncoupling the movements due to the composite rudders 4' distinguishes them from the plain rudders 4, which cannot produce any pure yaw like that already noted.

The yaw can be produced with only one of the composite rudders 4', while the panels of the one located on the other side of the main body 1 remain at rest. The roll is then controlled either exclusively by the single composite rudders 4, or by additional rotations of the panels of the rudders 4', which is possible in several ways and makes it possible to omit the single rudders 4, at the cost of greater complexity of controls (different motors are then necessary for the central panel 23 and the end panels 24) and potentially difficulties in keeping the roll and yaw movements uncoupled.

Figure 8:
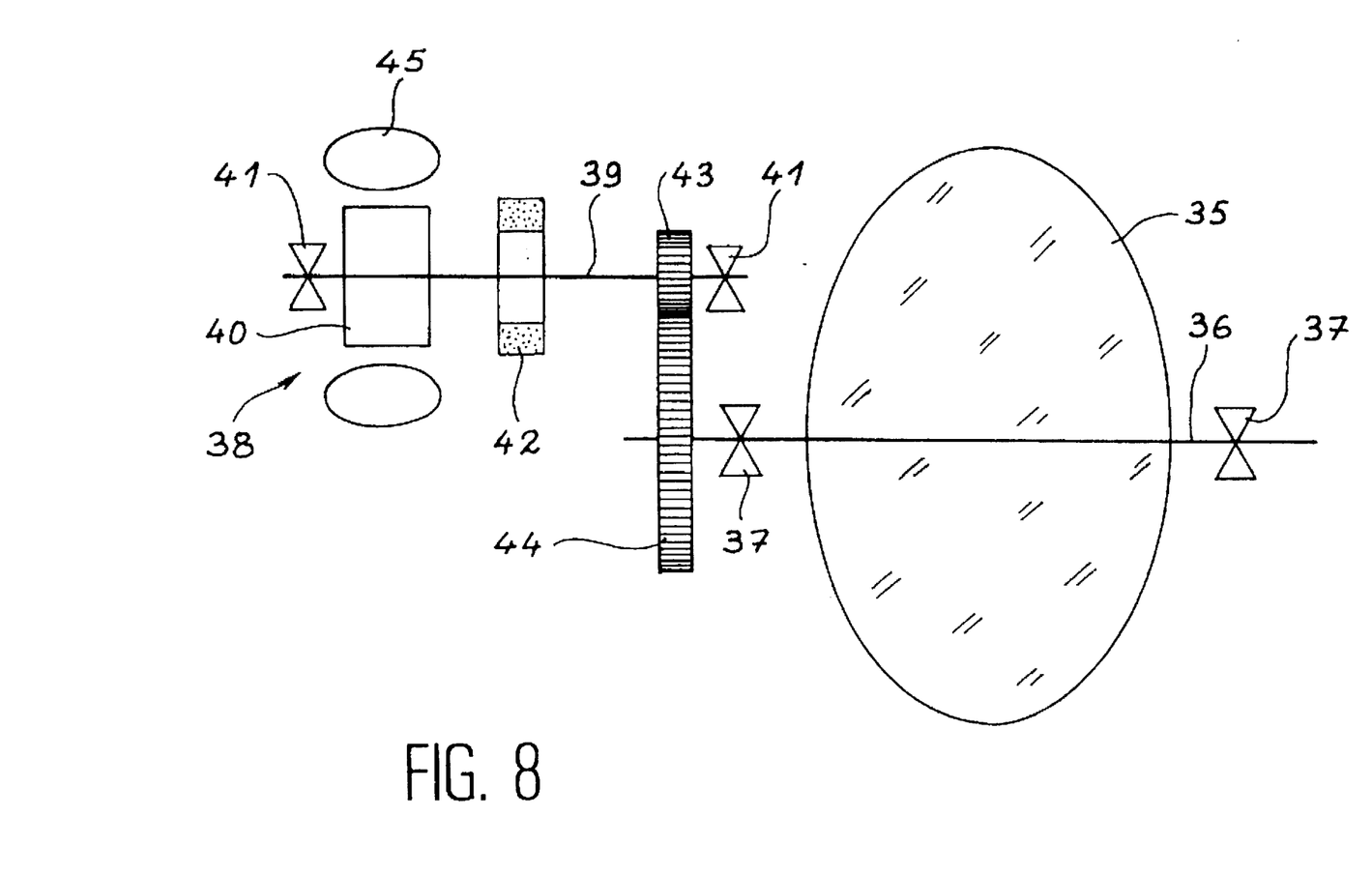
FIG. 8 shows a system for transmitting zero total kinetic force.

Now we will move on to an examination of another aspect of the invention, using FIG. 8. As has already been noted quickly, artificial satellites are equipped with a certain number of objects that have to be oriented periodically, and in particular with sighting mirrors 35 that are part of sensors directed toward the Earth, certain stars or certain places in the sky. Each sighting mirror 35 turns on an axis 36 whose position is defined by bearings 37 housed in a main body 1. A motor 38 brings about the rotational movement, using a transmission that includes a motor shaft 39 attached to the rotor 40 of the motor 38, whose position is defined by bearings 41, a dynamic equilibration ring 42 placed, if necessary, on the motor shaft 39, a pinion 43, and a toothed wheel 44 that engages in the pinion 43 and is connected to the axis 36. If the reducing ratio between the pinion 43 and the toothed wheel 44 is called R, according to the invention, it is necessary that R=Imi/Imo—where Imi is the sum of the inertias of the sighting mirror 35, the axis 36 and the toothed wheel 44, and Imo is the sum of the inertias of the rotor 40, the motor shaft 39, the dynamic equilibration ring 42 and the pinion 43. If this relation is followed, the kinetic moments of the rotating parts is canceled, no matter what the amplitude of the movement of the rotor 40 and the sighting mirror 35. No kinetic moment is therefore transmitted to the rest of the satellite by the stator 45 of the motor 38. The satellite's equilibrium is not disturbed. Of course, the axis 36 must be perfectly parallel to the shaft 39 and the mechanical play must be as small as possible. This result of canceling the kinetic moment can be generalized to any uneven number of reducing gears. A similar provision can, of course, be adopted for other rotating objects, such as the panels on the rudders. The only condition is that the axis of rotation be merged with a main axis of inertia of the rotating object.

I claim:

1. An artificial satellite comprising a main body encompassing a center of mass of the satellite, a longitudinal axis $X_S$, a transverse axis $Y_S$ and a third axis $Z_S$, the satellite being designed to fly in an atmosphere along an orbit defined by an orbit axis $X_A$ substantially aligned with a velocity vector and the longitudinal axis $X_S$ of the satellite above a heavenly body T present at a direction defined by a down axis $Z_A$, the longitudinal, transverse and third axes being mutually orthogonal, wherein the satellite comprises aerodynamic pitch control rudders rotatably movable around rotary spindles which are parallel to the transverse axis $Y_S$, the control rudders being situated in front of and behind the main body along the longitudinal axis $X_S$, the aerodynamic rudders being situated symmetrically with respect to a median longitudinal plane of the satellite which passes through the center of mass and is defined by the longitudinal and third axes.

2. An artificial satellite according to claim 1, characterized by the fact that the pitch rudders are built so as to avoid creating dead zones behind them.

3. An artificial satellite according to claim 2, characterized by the fact that the pitch rudders have front louvers (13) on their free ends, away from the main body (1).

4. An artificial satellite according to claim 2, characterized by the fact that the pitch rudders are made of panels (14) that get thicker toward the transverse axes.

5. An artificial satellite according to claim 2, characterized by the fact that the pitch rudders are composed of a sheet-metal strip (50) wound on rollers (51) adjacent to the main body (1) and held between the rollers by a telescopic arm (53).

6. An artificial satellite according to any one of claims 1 and 2 to 5, characterized by the fact that it has mobile aerodynamic roll and yaw rudders (4, 4') on both sides opposite the main body along the median longitudinal plane (XsZs) that rotate around transverse axes (21, 31, 32).

7. An artificial satellite according to claim 6, characterized by the fact that the roll and yaw rudders are located in pairs symmetrically in relation to the median longitudinal plane of the satellite.

8. An artificial satellite according to claim 7, characterized by the fact that it has at least two pairs of roll and yaw rudders.

9. An artificial satellite according to claim 6, characterized by the fact that roll and yaw rudders (4') are designed to produce pure yaws and have two groups of panels (23, 24) turned in opposite directions by the same motor (27) controlling two transmissions (28, 29) leading to the respective groups of panels.

10. An artificial satellite according to claims 8, characterized by the fact that it has a pair of rudders (4) moved in opposite directions to produce pure rolls.

11. An artificial satellite according to any one of claims 1 and 2 to 5 that has a plurality of systems, each system comprising a turning object, a motor to move said object and transmissions which connect said motor to said object, said motor has zero kinetic moment when the motor moves the object.

12. An artificial satellite according to claim 11, characterized by the fact that the turning objects include at least some of the rudders.

* * * * *

UNITED STATES PATENT AND TRADEMARK OFFICE
CERTIFICATE OF CORRECTION

PATENT NO. : 5,716,031

Page 1 of 2

DATED : February 10, 1998
INVENTOR(S) : Paul Duchon

It is certified that error appears in the above-indentified patent and that said Letters Patent is hereby corrected as shown below:

On the Title page:

In section {56}, please add the following U.S. Patent to the references cited --3,258,224  6/1966  Sohn--.

In section [56], after the U.S. Patent References Cited, please show the following Foreign References --

2,530,046  1/1984  France
    0,524,888  1/1993  Europe
    0,076,179  4/1983  Europe --.

In section [56], after the Foreign References, please show the following Other References --

JOURNAL OF SPACECRAFT AND ROCKETS, Vol. 29, No. 5, October 1992, Washington, D.C., pgs. 668-670, Santangelo, A. et al., "OPTIMAL WING CONFIGURATION OF A TETHERED SATELLITE SYSTEM IN FREE MOLECULAR FLOW" --.

UNITED STATES PATENT AND TRADEMARK OFFICE
CERTIFICATE OF CORRECTION

PATENT NO. : 5,716,031
DATED : February 10, 1998
INVENTOR(S) : Paul Duchon

It is certified that error appears in the above-indentified patent and that said Letters Patent is hereby corrected as shown below:

Column 7, line 3, delete "motor has zero kinetic moment" and insert --system has zero kinetic moment--.

Signed and Sealed this

Seventh Day of July, 1998

Attest:

BRUCE LEHMAN

Attesting Officer

Commissioner of Patents and Trademarks